United States Patent [19]

Kinley

[11] Patent Number: 5,438,587
[45] Date of Patent: Aug. 1, 1995

[54] PREIONIZER FOR LASER ASSEMBLY

[75] Inventor: Fred G. Kinley, Mission Viejo, Calif.

[73] Assignee: Spectranetics, Colorado Springs, Colo.

[21] Appl. No.: 221,357

[22] Filed: Mar. 31, 1994

[51] Int. Cl.⁶ ............................................. H01S 3/097
[52] U.S. Cl. ........................................ 372/86; 372/82
[58] Field of Search ........................ 372/86, 82, 87, 69

[56] References Cited

U.S. PATENT DOCUMENTS

| | | |
|---|---|---|
| 173,071 | 2/1876 | Sheldon . |
| D. 323,434 | 1/1992 | Moyniban et al. . |
| D. 340,142 | 10/1993 | Totoro . |
| 595,316 | 12/1897 | Leek . |
| 4,007,430 | 2/1977 | Fletcher et al. ............... 372/87 |
| 4,449,220 | 5/1984 | Chonausky et al. ........... 372/86 |
| 4,482,184 | 11/1984 | Mincey . |
| 4,549,091 | 10/1985 | Fahlen et al. . |
| 4,611,327 | 9/1986 | Clark et al. . |
| 4,691,322 | 9/1987 | Nozue et al. ................. 372/82 |
| 4,709,373 | 11/1987 | Scott et al. ................... 372/86 |
| 4,842,335 | 6/1989 | Wunderlich . |
| 4,891,818 | 1/1990 | Levatter . |
| 5,058,122 | 10/1991 | Gekat ........................... 372/82 |
| 5,188,632 | 2/1993 | Goldenberg . |

OTHER PUBLICATIONS

XMR, Inc. article on *150 Watt XeCl Excimer Laser, Model XC-150,* "Excimer Lasers Adapt to Angioplasty" by James Laudenslager, publisher May, 1988.

*Primary Examiner*—Léon Scott, Jr.
*Attorney, Agent, or Firm*—Richard L. Myers

[57] ABSTRACT

A preionization assembly is adapted for use with a laser including a laser vessel, a high voltage electrode and a ground electrode defining a discharge region extending longitudinally within the vessel. A plurality of pin assemblies are arranged in at least one line which extends longitudinally through the vessel along the discharge region. These pin assemblies are generally equally spaced along the line, each including an anode pin and a cathode pin oriented relative to each other so that a spark passing therebetween arcs in a direction which is longitudinal of the vessel along the discharge region. The pin assemblies may be oriented in two parallel lines disposed in equally spaced relationship to the discharge region.

9 Claims, 5 Drawing Sheets

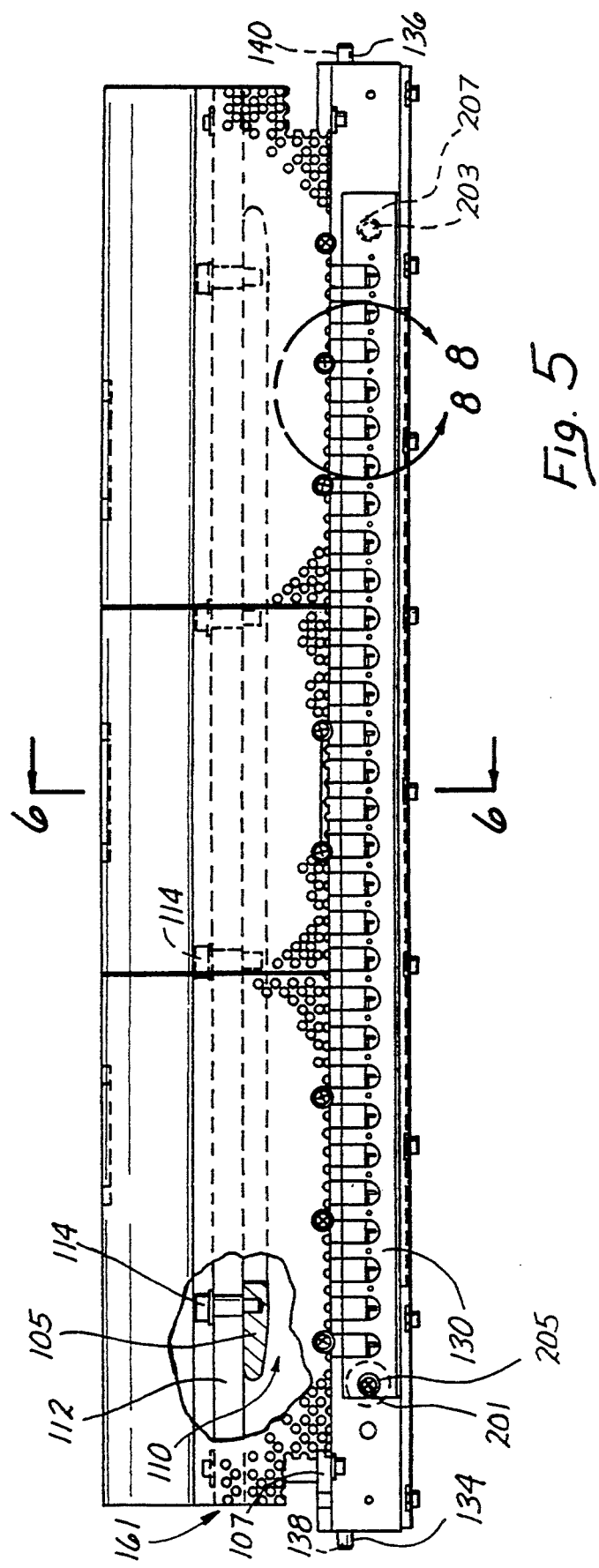

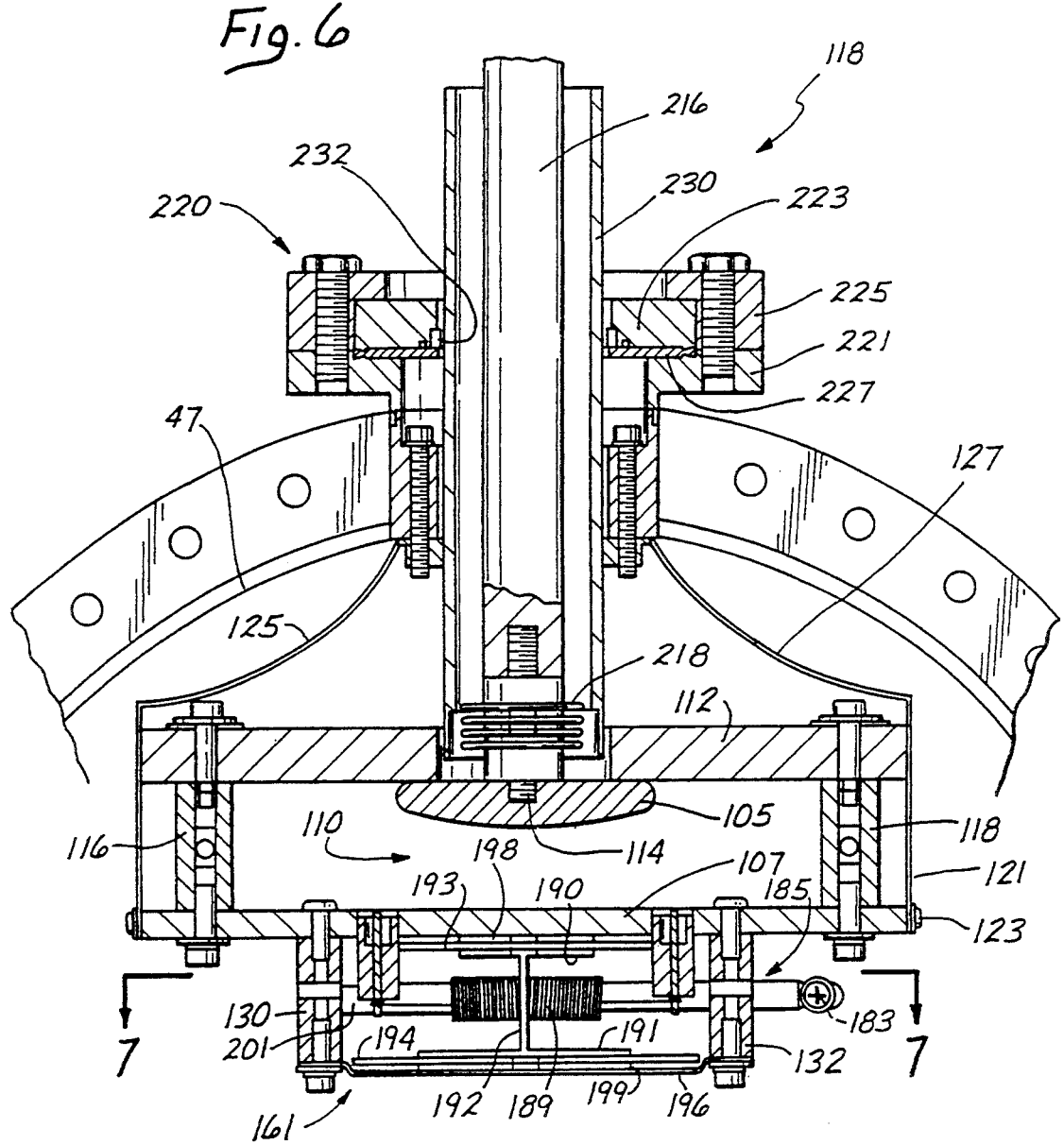

[5,438,587]

PREIONIZER FOR LASER ASSEMBLY

BACKGROUND OF THE INVENTION

1. Field of the Invention

This invention relates generally to preionizers adapted for use with above atmospheric pressure gas discharge lasers and more specifically pulsed transverse electric discharge excimer or rare gas halides lasers.

2. Discussion of the Prior Art

An excimer laser functions as a result of the lasing transitions of certain noble gas-halogen molecules which normally would not exist at room temperature. The excimer molecules are typically formed in electrical discharges, where the atomic species are given sufficient energy to bond. Formation of a usable laser beam from such an electrical discharge necessitates that the discharge be as spatially uniform as possible in both laser gain (formation of upper state lasing transition) and index of refraction (depletion of discharge species).

It is well established in the field of excimer lasers that some level of ionization of the excimer gas is required prior to initiation of the main laser discharge. This preionization aids in development of the most spatially uniform electrical glow discharge. Almost all commercially available excimers utilize a transverse electrical aperture (TEA) arrangement of the discharge electrodes. This results in an electrical discharge which is narrow in the anode to cathode direction but long along the face of the electrodes. In order to keep the discharge stable along the length of the electrodes, a high degree of parallelism is required between the anode and cathode faces. This can be accomplished by constructing a main discharge electrode subassembly which mechanically supports the electrodes in relation to one another and allows the relative electrode parallelism to be established in a subassembly prior to incorporation into the laser vessel.

The preionization of the main laser discharge medium prior to initiation of the main electrical discharge, enhances the stability of the discharge thus formed. The initial electrical breakdown of the gas from a high impedance non-ionized state to a highly ionized low impedance, ideally glow discharge, requires an avalanching of the initial free electron density of the gas by many orders of magnitude. This avalanching of the electron density is accomplished under the influence of an electric field produced by a high voltage potential applied across the discharge electrodes until full discharge current conduction occurs. The generally exponential avalanche of electron density within this main discharge region is highly dependent on the spatial uniformity of the initial free electrons present and is greatly affected by the shape and position of the main discharge electrodes across which the high voltage potential is applied.

In the preionizer main discharge electrode arrangements of the prior art where this uniformity is not assured, regions of the discharge with higher initial electron number densities have tended to avalanche more quickly than weaker regions, preferentially draining the main discharge current.

Excimer lasers have typically used three major types of preionization schemes: 1) x-ray ionization, 2) corona plasma UV ionization, and 3) spark UV ionization.

X-ray preionization provides extremely uniform preionization and high levels of free electron density generation but unfortunately generally requires a separate cost-significant high-voltage driving circuit as well as a mechanical design sufficient to withstand repeated high voltage pulses in a vacuum tube environment. X-ray preionization may also find it difficult to provide a proper X-ray transparent window onto the discharge region which can mechanically withstand the force of an above-atmospheric pressure laser medium. These requirements make it difficult to implement x-ray preionization cheaply, compactly, and safely.

Corona plasma preionization involves forming a stable corona plasma in the laser gas. Corona plasma is a weak electrical discharge associated with gaseous breakdown under the influence of high electric field strength, with no current-source path through the incipient discharge. Since energy is only put into the corona plasma from the fields in the vicinity, relatively low plasma temperatures are created, producing only relatively weak UV photons. These photons do not ionize very far into the laser gas without attenuation. As a result, the corona plasma preionizer -must be located physically close to the desired laser discharge region in order to obtain enough preionization density to be significant to the laser discharge formation.

Spark preionization provides small discharge arcs along the discharge length. These arcs emit weak x-ray and hard UV photons which propagate through the discharge region. Each spark is a controlled arc-discharge with inherently high plasma temperature, producing harder UV emission than other plasma types.

The absorption of the photons produced by sparks driven by the discharge medium, may result in a decreasing preionization electron density with increasing distance from the spark. This is also true of the x-ray, and corona-type preionizers, each of which has its own absorption function based on the discharge medium. This local strong-absorption of the preionizing radiation produces a local preionization electron density. As a function of distance from the source the local preionization electron density can be measured for a particular device. This measurement can then be used to predict the preionization gradients which will be present in the main discharge region when potential is applied across the main discharge electrodes. The main discharge electrode geometry can then be suitably matched to provide the most uniform discharge.

The main drawbacks to using spark preionization are the potential for spark pin electrode deterioration, and the difficulty of implementing a uniform set of sparks along the long-axis of the laser discharge without compromising distance from the discharge or peak arc current.

In general, the energy distribution of the photons emitted from a spark can be thought of as being a function of the electric field strength across the spark pin electrodes at the time of the spark-initiating avalanche, as well as the black-body radiation distribution resulting from the temperature of the actual speck arc-discharge formed. The mechanical shape of spark pin electrodes and the driving circuit will affect the quantity and distribution of the ionizing radiation formed.

SUMMARY OF THE INVENTION

The present invention relates to the formation of an excimer laser spark ionization scheme which provides excellent spark-tospark uniformity along the long-axis of the laser and additionally facilitates a fast rising edge of voltage across the individual spark pins. It also provides for a short, high current spark discharge arc so that the maximum UV preionization can be obtained. By keeping the total charge cycled through the arc small, heating of the spark pin electrodes themselves can be minimized, thus minimizing spark pin erosion and degradation. By providing a virtual source of charge within the laser head to drive the sparks along the length of the electrical discharge, uniformity from spark to spark can be attained without compromising these electrical parameters. In order to provide the high peak currents desired, a source of charge having a short LC ring time needs to be coupled through each spark pin pair.

In one aspect of the invention, a preionization assembly is adapted for use with a laser including a laser vessel and having a cathode electrode and an anode electrode defining a discharge region extending longitudinally through the vessel. The assembly comprises a plurality of spark pin assemblies arranged in at least one line extending longitudinally through the laser vessel along the discharge region, the pin assemblies being generally spaced along the line. An anode pin and a cathode pin are included in an associated one of the pin assemblies. The anode pin is oriented relative to the cathode pin so that a spark passing between the anode pin and the cathode pin arcs in a direction which is longitudinal of the vessel along the discharge region. Each spark is individually ballasted to a virtual source of charge such that there is no direct current flow between pin assemblies.

In another aspect of the invention, a laser includes a laser vessel having a longitudinal configuration and defining a laser cavity. A cathode electrode is disposed in the cavity and has a length extending longitudinally of the vessel. An anode electrode is disposed in the cavity and has a length extending longitudinally of the vessel. The anode electrode also extends along the cathode electrode and defines a discharge region with the cathode electrode. A halogen gas is disposed in the vessel. A preionization assembly is positioned along the discharge region for ionizing the laser gas to a generally uniform density in the discharge region. A plurality of pin assemblies are included in the preionization assembly and arranged to form at least one line extending longitudinally in the cavity in general proximity to the discharge region. The pin assemblies are generally equally spaced along the line and include an anode pin and a cathode pin The anode pin is spaced from the cathode pin in a direction such that a spark passing between the two pins arcs in a direction extending along the line. Each spark is individually ballasted to a virtual source of charge such that there is no direct current flow between the pin assemblies.

Although preferred embodiments of the preionizer are disclosed for an excimer spark preionization scheme, it will be understood that the concept is equally applicable to corona preionization and x-ray preionization applications. These and other features and advantages of the invention will be more apparent with discussion of the preferred embodiments and best mode of the invention, and reference to the associated drawings.

DESCRIPTION OF THE DRAWING

FIG. 5 is a side elevation view partially in phantom of the electrode assembly associated with the present invention;

FIG. 6 is a cross section view of the electrode assembly taken along lines 6—6 of FIG. 3 and FIG. 5, and further illustrating a preferred orientation of the lateral high voltage feed relative to the electrode assembly;

DESCRIPTION OF PREFERRED EMBODIMENTS

Figure 1:
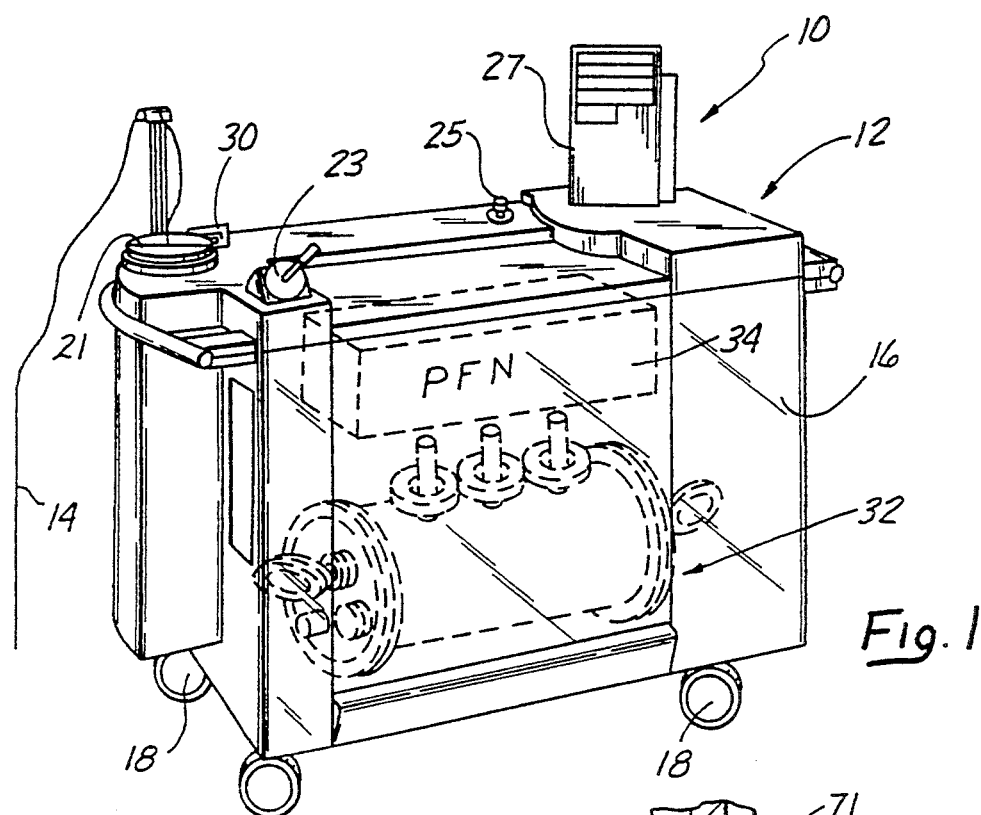
FIG. 1 is a perspective view of a medical laser including a laser head of the present invention.
Figure 4:
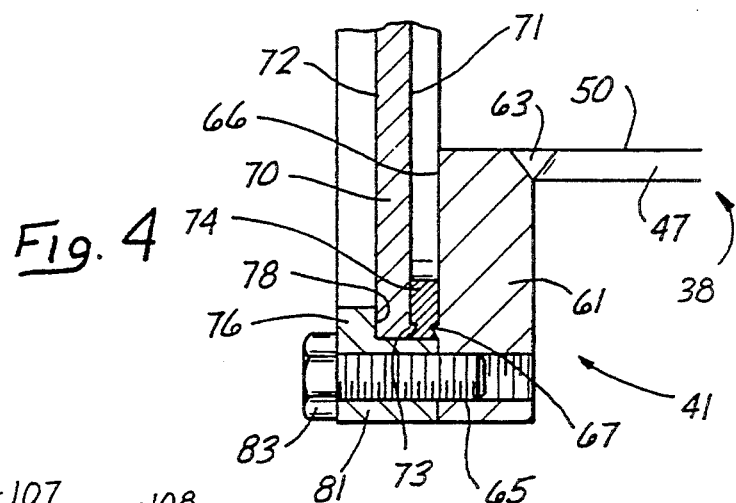
FIG. 4 is a cross section view of an end flange assembly taken along lines 3a–3a of FIG. 3.
Figure 8:
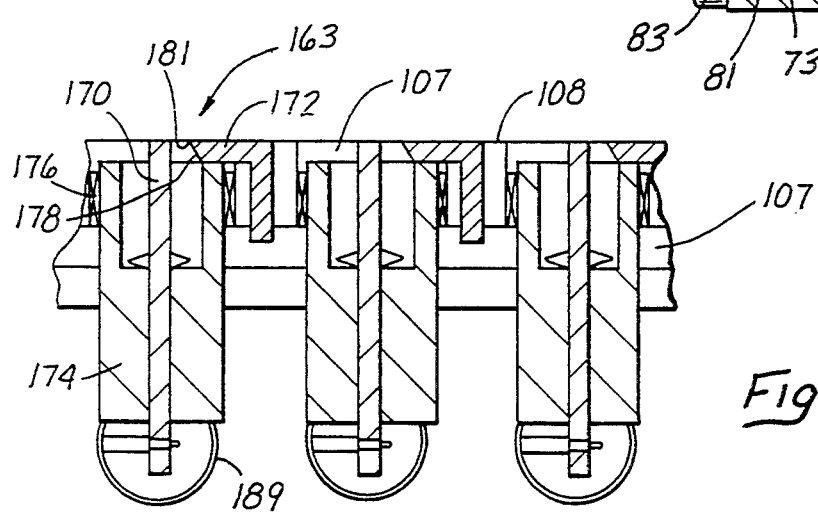
FIG. 8 is a cross section view of preionizer pins taken along lines 8—8 of FIG. 7.

A medical laser is illustrated in FIG. 1 and designated generally by the reference numeral 10. This laser 10 includes console 12 which generates laser energy with characteristics preferred for medical applications, and a catheter 14 which delivers that energy to a patient. In a preferred application of the laser 10, the catheter is introduced into the coronary arteries of the patient where the laser energy is used to ablate occlusive plaque. The characteristics desired for the laser energy as well as the process for administering that energy through the catheter 12, can be better understood with reference to applicants copending application Ser. No. 07/909,054 filed on Jul. 2, 1992 and entitled "Apparatus and Method for Optically Controlling the Output Energy of a Pulsed Laser Source. Preferred methods and apparatus associated with the catheter 14 can be found in applicant's U.S. Pat. No. 5,188,632 issued Feb. 23, 1993 and entitled "Guidance and Delivery System for High Energy Pulsed Laser Light."

The console 12 includes the cabinet 16 which is portably movable on casters 18. Mounted on the cabinet 16 is a catheter pedestal 21, a fluence detector 23, an emergency switch 25, and a display and control panel 27. Operation of the laser 10 can be greatly facilitated by provision of a card reader 30 of the type disclosed and claimed in applicant's copending application Ser. No. 08/063,898 filed on May 18, 1993 and entitled "Optical Catheter Specification Data System and Method of Using Same. In order to facilitate an understanding of the present invention, each of these applications is incorporated herein by reference.

Of particular interest to the present invention is a laser head designated generally by the reference numeral 32, and a pulse forming network 34 which supplies the electrical energy necessary to energize the laser head 32. This pulse forming network 34 is disclosed and claimed in applicant's copending application filed on even date herewith. In operation, the laser head 32 produces laser energy which is introduced through the pedestal 21 to the catheter 14. Placing the end of the catheter 14 into the fluency detector 23 enables one to measure the exact magnitude of the laser energy at the point of delivery.

Figure 2:
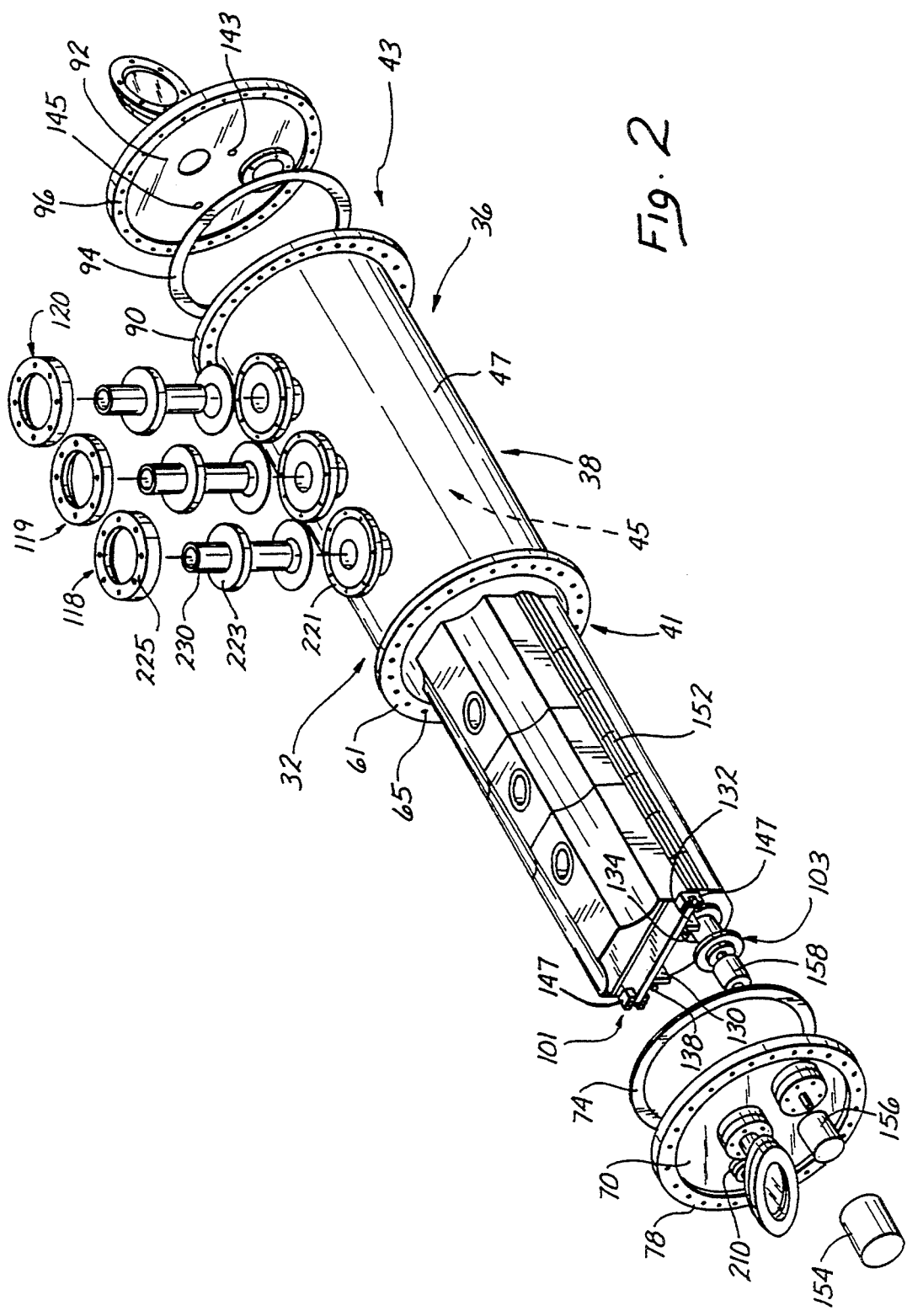
FIG. 2 is an axially exploded view of the laser head illustrated in FIG. 1.
Figure 3:
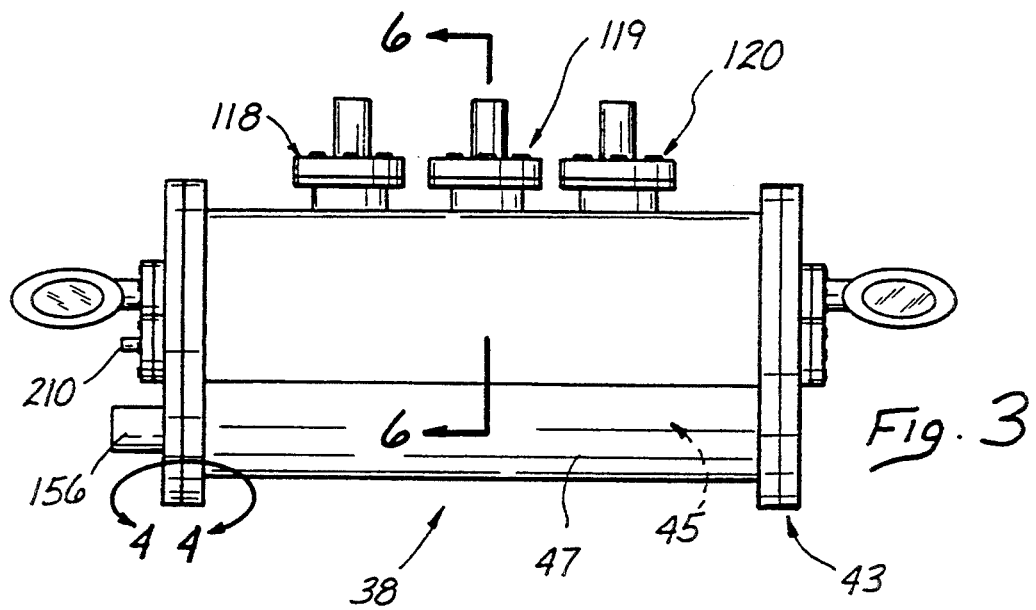
FIG. 3 is a side elevation view of the laser head illustrated in FIG. 1.

A preferred embodiment of the laser head 32 is best illustrated in the exploded view of FIG. 2 and the side elevation view of FIG. 3. This embodiment of the laser head 32 includes a housing or vessel 36 formed from a tube 38 and end sections 41 and 43 which define a laser chamber 45. The tube 38 of the vessel 36 is formed with a wall 47 having an inner surface 50 and the shape of a hollow cylinder. This shape is commercially available and is preferred in order to meet ASME standards for pressure containment vessels. By maintaining the cylindrical shape as much as possible, the wall 47 of the tube 38 can be relatively thin thereby reducing the overall weight of the system. In a preferred embodiment, the wall 47 of the tube 38 is formed of stainless steel and has a thickness of about 0.125 inches.

The stainless steel material forming the vessel 36 is of particular advantage. Prior materials such as aluminum have relied upon plating of halogen compatible materials on the surfaces defining the chamber 45. In order to reduce the cost and the possibility of chipping which is commonly associated with plating, the end sections of the prior art vessels have required elastomeric O-rings. Although these O-rings have reduced the possibility of chipping in the end sections, they have undesirably resulted in a high degree of outgassing and permeability, which has degraded the halogen gas over a relatively short period of time. The stainless steel material forming the laser head 32 does not require plating to withstand halogen attack, when it is properly processed via electropolishing and when water-halogen reactions forming acids are minimized. As a result, the end sections 41 and 43 can also be formed of stainless steel using off-the-shelf vacuum industry knife edge flanges and metal gaskets.

A preferred embodiment of the end section 41 is illustrated in greater detail in FIG. 3A. This end section 41 is formed by stainless steel vacuum flanges sometimes referred to as Conflat flanges. This structure includes a ring flange 61 which is sealed to the wall 47 of the tube 38 at a weld 63. The ring flange 61 is chosen with an inner diameter which is substantially equivalent to that of the inner surface 50 of the wall 47. This enables the weld 63 to be formed as a single interior weld which is preferably a 100% weld extending through substantially the entire thickness of the wall 47. It will be noted that the weld 63 is an interior weld which is formed as a single bead. With these characteristics, the weld 63 does not entrap impurities which might ultimately degrade the halide gas in the chamber 45. The ring flange 61 is provided with a plurality of bolt holes 65, which are spaced around its circumference. The flange 61 also has an outer surface 66 and a knife edge 67 which protrudes from the surface 66 outwardly of the tube 38.

The end section 41 also includes a plate flange 70 which has an inner surface 71 and an outer surface 72. The plate flange 70 is sized and configured to extend across the circular opening at the end of the tube 38. The flange 70 is also provided with a circular knife edge 73 which extends inwardly of the tube 38, so that the two knife edges 67 and 73 face each other. A circular metal gasket 74 is disposed between the knife edges 67 and 73 on the flanges 61 and 70 respectively.

A circular collar 76 has an inwardly facing shoulder 78 and a plurality of bolt holes 81 which extend around its circumference in individual alignment with the bolt hole 65 on the ring flange 61. A plurality of bolts 83 extend through the holes 81 to engage a threaded nut or threaded hole 65. As the bolts 83 are tightened, the collar 76 is drawn toward the ring 61. This collar 76 is sized so that the shoulder 78 engages the outer surface 72 with the plate flange 70 sandwiched between the collar 76 and the ring flange 61. With the gasket 74 disposed between the knife edges 67 and 73, tightening of the bolts 83 causes the material of the gasket 74 to spread circumferentially outwardly and to form a virtually impermeable and vacuum seal between the ring flange 61 and the plate flange 70. The resulting seal is also capable of withstanding the multi-atmospheric pressures of laser mediums. A similar flange structure can be provided at the end section 43 which includes a ring flange 90, plate flange 92, metal gasket 94, and collar 96.

All of the flanges 61, 70, 90, 92, as well as the collars 76, 96 are preferably formed of stainless steel. These components are readily available so that the component costs associated with the end sections 41 and 43 are significantly reduced over similar structures of the prior art. Where metal gaskets, such as the gaskets 74, 94 have been intolerable in nickel-plated aluminum structures of the past, the low cost and high integrity provided by the metal gaskets 74, 94 and the associated knife edges are particularly appreciated in the present invention.

In a preferred embodiment the metal gasket material is the vacuum industry-standard pure oxygen free high conductivity (OFHC) copper. While this metal is known to be susceptible to chemical attack, the gasket provides for minimum water permeation which inhibits the formation of significant amounts of halogen-acid from the halogen laser medium. This prevents significant attack of the copper gasket by chemical reaction.

It can also be appreciated that the more chemically strong (electro-negative) halogens present the greatest potential for chemical reaction. For this reason it may also be desirable to eliminate as much of these other halogen species as possible, leaving only the desired halogen of the laser medium disposed inside the laser vessel. For the same end, chemically inert materials such as metal-oxides and high purity metals such as Nickel 200, are preferred.

While solid nickel has been contemplated for the vessel structure, this material is generally thought to be too expensive to use in a solid form. Hence, nickel plating of less expensive materials, such as aluminum, has been preferred. The plating associated with prior vessels has been necessary in order to present a compatible surface to the halogen gasses in the chamber 45.

In order to avoid this plating and its propensity for chipping, the vessel needs to be formed of a homogeneous material which may consist of either a single solid material or an alloy. Furthermore, the materials used must present a surface which is halogen compatible. It has generally been felt that stainless steel does not meet these criteria since it is relatively reactive with halogens primarily due to its iron content. However, in accordance with the present invention, it has been found that a homogeneous material such as stainless steel can be electropolished to change the nature of the interior surfaces defining the chamber 45.

The process of electropolishing accomplishes two purposes. First, the surface being polished is highly smoothed. This insures that surface imperfections, which might otherwise entrap impurities and moisture, are substantially removed. This is greatly appreciated in any design intended to extend gas life.

Second, the electropolishing process tends to remove relatively reactive atoms from the composition of stainless steel so that the percentage content of less reactive atoms, such as chromium, is increased at the halogen contacting interior surface. Since chromium is relatively compatible with halogen gasses, this electropolishing process enables the vessel 36 to be formed of a homogeneous metal alloy which is relatively inexpensive and provides an interior surface which is halogen compatible. This can all be achieved without suffering the consequences of surface plating, thereby permitting the use of the metal gasket 74 and low cost flanges 61 and 70 previously discussed.

The orientation of components within the chamber 45 is also of interest to the present invention. These components include an electrode subassembly 101 and a fan or blower subassembly 103. Both of these subassemblies 101, 103 extend longitudinally between the end sections 41 and 43. As discussed above, the electrode subassembly is designed such that the relative electrode mechanical alignment can be established outside of the laser vessel prior to final laser assembly. In a similar manner, the subassembly comprising the rotating blower and associated bearings is designed such that it can be assembled and operationally checked prior to final laser assembly. These assemblies 101, 103 can be mounted to the plate flange 70 to facilitate alignment and assembly of the laser head 32.

The electrode subassembly 101 is illustrated in greatest detail in FIG. 5 and 6. This subassembly 101 includes a first electrode 105, which functions as a cathode in a preferred embodiment, and a second electrode 107 which functions as an anode in the preferred embodiment. It will be appreciated that the relative ground reference chosen for the laser electrode is immaterial to the laser operation. However, choosing the outside of the laser pressure vessel at the high voltage feedthroughs to be "ground", has the advantage of minimizing electric field EMI radiation emitted from the laser during discharge electrical excitation. The electrodes 105, 107 are relatively narrow in cross section, as illustrated in FIG. 6, but have a substantial longitudinal dimension, as illustrated in FIG. 5. Thus they are disposed to extend longitudinally though the tube 38 where they define a discharge region 110 of the chamber 45.

In the process of laser discharge conduction, the cathode, or negatively biased electrode will be bombarded by the positively-charged ionic species produced in the electrical discharge. This site of ion-current is expected to be the most chemically reactive and abrasive site in the halogen laser. The cathode electrode 105 is therefore preferably formed of solid nickel and is rigidly held to a metal-oxide ceramic support/insulator 112 by a plurality of bolts 114, best illustrated in FIG. 5. The anode electrode 107 will suffer less of the ion-bombardment (or plasma cleaning effect), preferentially drawing the more benign negatively charged electron-current. Nevertheless, in a preferred embodiment the anode electrode 107 is be formed of a high purity, highly electrically conductive material such a nickel-plated aluminum. The anode electrode 107 can be provided in a generally planar configuration in order to facilitate cost-effective manufacture.

The electrode 105 and electrode 107 are critically aligned in a fixed relationship by stainless steel spacers 116 and 117 which are bolted between the support 112 and the electrode 107. The spacers must be located sufficiently far from the laser electrodes, or be insulated, and to prevent arc-over via surface tracking during application of the high voltage across the electrodes 105, 107.

In the illustrated embodiment, spacers 116, 117 are provided only at the corners of the rectangular ceramic insulator plate holding the cathode electrode. In these locations they can be easily located away from the edge of the electrode 105. This requires the use of a ceramic insulator plate of sufficient strength to maintain the electrode parallelism along the length of the discharge, but forces any major electrode misalignments to be simple bowing over the full length of the discharge region, are This type of misalignment is much less detrimental to the performance of the discharge.

The cathode electrode 105 is electrically charged via three main current feedthroughs designated generally in FIG. 2 by the reference numerals 118, 119 and 120. In order to keep the laser head main discharge loop inductance within limits suitable for an external main PFN driving circuit, the feedthroughs 118–120 are equally spaced along the length of the laser vessel wall.

The discharge region 110 defined by the electrode 105 and 107, and discharge current feedthroughs 118–120, are surrounded by a current return shroud 121 which is mounted to the electrode 107 by screws 123. This current return shroud 121 extends upwardly from the anode electrode 107 around the cathode electrode 105 and associated support/insulator 112. The shroud 121 can also be formed from electropolished stainless steel. Above the support 112, the shroud 121 is provided with a pair of concave wings 125 and 127 which are attached to the wall 47 of the vessel 36 in a manner subsequently discussed. The concave shape of the wings 125, 127 facilitates alignment of the electrode subassembly 101 within the chamber 45.

Attachment of the current return shroud 121 to the tube 38 along a relatively small area of the wall 47 is of particular advantage to the present invention. Where current returns of the past have contacted the vessel wall over widely separated points, electromagnetic interference has radiated from a relatively large area of the vessel wall where significant amounts of current flow. This has been objectionable even where the potential of the wall at a particular point is near the ground reference potential. In the present invention the wall 47 is contacted over a smaller area, approaching the ideal of a single point, so that the tube 38 no longer functions as a current path producing a large magnetic-field antenna. In fact, the tube 38 shields its own internal current path, so that electromagnetic interference of the high-current laser discharge is greatly reduced. This advantage is particularly appreciated by those monitoring the digital electronics associated with the console 12 or other electronic apparatus in the surgical environment.

The electrode subassembly 101 contains a pair of stiffening ribs 130, 132 which extend from the anode 107 on the side opposite the cathode electrode 105. These ribs are used to provide mechanical support along the long axis of the flat anode electrode 107 as discussed above. The ribs 130, 132, extend longitudinally through the chamber 45 but include at each end an associated tab or pin which extends axially of the electrode subassembly 101. As best illustrated in FIG. 5, the rib 132 includes a tab 134 and a tab 136, while the rib 130 includes a tab 138 and a tab 140. These tabs are received in complimentary holes in the associated plate flanges 70 and 92. For example, the tabs 134 and 138 are received in holes (not shown) in the plate flange 70, while the tabs 136 and 140 are received in holes 143 and 145, respectively, in the plate flange 92. Thus the tabs 134–140 positionally locate the self-supporting electrode subassembly 101 on the plate flanges 70 and 92 of the end sections 41, 43, respectively.

The electrode subassembly 101 thus located is more rigidly mounted to the plate flange 70 in the end section 41 by a pair of bolt flanges 147. For ease of assembly similar bolt flanges are not provided at the end section 43. Rather, during the assembly process, the end section 41 of the electrode subassembly 101 is mounted to the plate flange 70. Then the tube 38 is slipped or otherwise moved over the opposite end section 43 of the electrode subassembly 101. Finally, the plate flange 92 with the holes 143, 145 is positioned to receive the tabs 136 and 140. While the bolt flanges 147 and the tabs 134,138 provide support for the electrode subassembly 101 at the end section 41, ly the tabs 136, 140 and associated holes 143, 145 provide support for the opposing end section 43. In a preferred embodiment the support provided by the tabs 136, 140 is not rigid but merely sufficient to allow the electrode subassembly 101 to be located the preferred end to end position, without increasing the manufacturing tolerance of the welded stainless steel laser vessel. It is additionally preferable that the end of the electrode subassembly 101 having the preionizer current return, be mechanically screwed in place to insure proper current flow without sparking at the electrode/flange contact areas.

The blower subassembly 103 also has a longitudinal configuration so that it extends in a generally fixed relationship with the discharge region 110 between the end sections 41 and 43. The blower subassembly 103 includes an elongate cross flow fan 152, flow ducting, bearings, and an internal magnet 158 associated with a magnetic-coupler. An external magnet 154 of the magnetic coupler is driven by an electric motor which is mounted to the exterior of the plate flange 70. The external magnet 154 is coupled through the vessel wall to the internal magnet 158 through a cylindrical enclosure 156 which is preferably formed from a non-magnetic material such as stainless steel.

With the blower subassembly 103 mounted to the plate flange 70, the internal magnet 158 extends into the enclosure 156 and is rotated by a rotating magnetic field created by the motor and associated external drive magnet 154. In this manner the blower subassembly 103 can be operated without sacrificing the integrity of the chamber 45.

Figure 7:
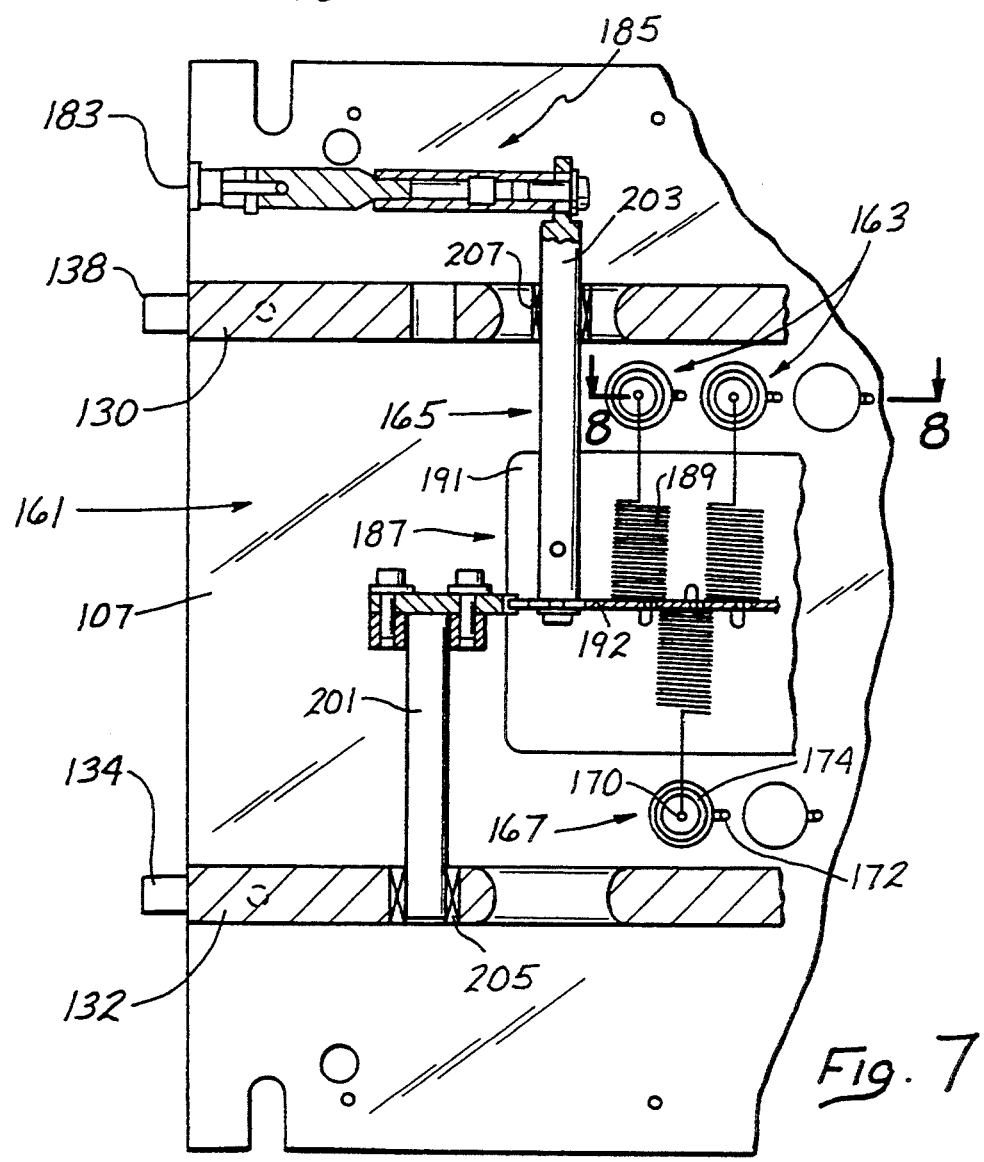
FIG. 7 is a top plan view partially in section of a preionizer assembly taken along the lines 7—7 of FIG. 5.

A preionizer assembly 161 is illustrated in FIGS. 5-8 and designated generally by the reference numeral 161. The preionizer 161, as illustrated in FIG. 7, includes a plurality of pin assemblies 163 each disposed in one of two rows 165 and 167 which extend parallel to each other and parallel to the electrodes 105, 107 along the length of the discharge region 110. A total of fifty-eight pin assemblies are shown in FIG. 7 with three of the pin assemblies 163 illustrated in the enlarged view of FIG. 8.

Each of these pin assemblies 163 includes a cathode pin 170 and an anode pin 172. The cathode pin 170 is supported by an insulator 174 that is held in a fixed relationship with the discharge electrode 107 by a flexible bushing 176. The cathode pin 170 is electrically isolated by the insulator 174 from the discharge electrode 107. By comparison, the anode pin 172 is in electrical contact with the discharge electrode 107. In proximity to the anode pin 172, the cathode pin 170 extends perpendicular to the surface 108 of the discharge electrode 107 but terminates generally flush with the surface 108. In proximity to the cathode pin 170, the anode pin 172 extends generally flush with the surface 108 and has an end surface 178 which faces the cathode pin 170. This surface 178 is preferably beveled so that the anode pin 172 presents a sharp edge 181 in closest proximity to the anode pin 170, for electric-field enhancement.

The cathode pin 170 is energized through an electrode 183, a connecting structure 185, an I-beam 187 and an associated ballasting inductor 189. These elements are best illustrated in the plan view of FIG. 7. The cross section of the I-beam 187 can be seen in FIG. 6. This I-beam 187, which functions as a distributive feed, extends along the length of the discharge region 110 between the rows 165, 167 of the pin assemblies 163. The close proximity of the I-beam 187 to the neighboring surfaces provides capacitive characteristics while the inductors 189 provide inductive characteristics as discussed in greater detail below.

The spark pin assemblies 163 are positioned on either side of the discharge region 110 such that the sparks generated will strike an arc between the cathode pin 170 and the associated anode pin 172. Unlike previous spark preionizers, each spark current loop will draw charge from its own region of capacitance along the distributed feed 187. The orientation of these pins 170 and 172 is such that the resulting spark will arc in a direction which is parallel to the length of the discharge region 110. This presents the greatest surface of spark along a path which extends generally parallel to the associated pin assembly row 165, 167, equidistant from the discharge electrode 105.

As noted, the cathode pin 170 of each pin assembly 163 is tied to the distributed feed, such as the I-beam 187, through the small ballasting inductor 189. This inductor slows the discharge ring through the spark pin assembly 163, a time sufficient to allow each gap between the spark pins 170, 172 to avalanche and break down prior to draining its corresponding region of charge from the distributed feed or I-beam 187. Preionization of one spark by another may lead to more uniform breakdown initiation among the sparks. This further decreases the size of the required spark ballast, such as the inductors 189, thereby increasing the peak current possible through each spark. The minimum desired ballast inductance for the inductors 189 is desired in order to minimize the ring time of the localized charge through the spark gap. This ring time is equivalent to the square root of LC where L is the inductance of the inductor 189 and C is taken as the fractional capacitance of the I-beam 187 per spark.

The distributed feed or I-beam 187 is designed such that the external driving circuit sees both a low inductance loop external driving circuit, (which allows for a fast external current ring time), as well as a distributed capacitance (which permits internal spark pin current sourcing along the discharge region 112). In comparison to a simple wire suspended in space above a flat plane, the I-beam 187 has a relatively low inductance and a relatively high capacitance so that in the preferred embodiment it charges uniformly along its length prior to the commencement of sparking. A simple wire suspended in space along this same region would have significantly different inductive paths for the nearest sparks as opposed to the furthest sparks. This is due to the significant additional length of small diameter wire which is needed to reach the far end of the laser electrode. This is undesirable and avoided in the present construction where the distributed feed or I-beam 187 has a relatively small incremental inductance along the length of the electrode, resulting in inductive loop paths which are closely matched for all spark locations. This construction inherently provides an even distribution of charge to both the nearest and furthest sparks, so that even charge distribution advantageously occurs along the entire length of the I-beam 187.

In the best mode of the invention, a fast, high voltage pulse is applied through the electrode 183 to the cathode pin 170. This uniformly charges the distributed capacitance which results from the close proximity of I-beam 187 to the plane defined by the anode electrode 107.

The I-beam 187 has a pair of end flanges 190, 191 and a center flange 192 extending therebetween, which form the distributive feed. The end flange 190 is held in close proximity to the flat electrode 107 without arcing by use of a ceramic or plate glass insullator 193. Similarly, the end flange 191 is isolated from the surface of the preionizer cover 196 by an insulator 194. In both cases, the insulators 193 and 194 are spaced from the respective electrode 107 and cover 196, by a small spacer 198 and 199 respectively. These spacers 198, 199 serve to defeat the progression of any corona plasma which is created at the fringing electric field regions, from advancing across the insulators 193, 194. Without this corona abatement, the corona could bridge the insulator gap and form a true arc which would short out the internal capacitance and distributive feed, stopping the sparks.

These insulators 193, 194 extend between the stiffening ribs 130, 132 and are captured longitudinally by small tabs (not shown), thereby preventing any mechanical misalignment which might compromise the insulative properties. The I-beam 187 is rigidly held by ceramic posts 201 and 203, which are connected to the stiffening rib 130, 132, respectively, with flexible bushings 205, 207 similar to the bushings 176 associated with pin assemblies 163. Providing a rigid mechanical assembly for the I-beam 187 facilitates the incorporation of an externally removable preionizer feedthrough 210, best illustrated in FIG. 1. As with the main discharge feedthroughs 118–120, the preionizer feedthrough 210 is of a co-axial design and is disposed in the immediate vicinity of the vessel wall in order to lower inductance. In this case, corona is defeated immediately inside the vessel wall by conductors which are large-radiused providing the electrode 183 and connecting structure 185 with large radii in order to minimize electric field enhancement and to produce local electric field strengths below the onset of corona.

The chemical inertness of the metal oxides found in ceramic and glass are in keeping with the overall philosophy promoting maximum halogen gas life as discussed above. Choosing a material for the insulators 193, 194 which has a proper dielectric constant allows fine tailoring of the preionizer distributed capacitance value. The capacitance of the I-beam structure can be calculated by taking the area of the close gaps divided by the gap width times the dielectric constant of the material.

In operation, a fast rising voltage, applied to the I-beam 187 from an external driving circuit (not shown) over-voltages the gap between the spark pins 170, 172 and leads to a high electric field avalanching arc in the gap. The high electric fields produce highly excited and ionized atomic species which rapidly radiate hard UV photons. As the arcs between the associated spark pin pairs 170, 172 stabilize, the high peak current in the sparks drive the plasma temperature up to a point where a virtual optically-thick UV black body radiation source is created. Emission from this virtual source further contributes to the UV emissions obtained.

The uniformity of the preionization density obtained from firing the spark pin assemblies 163 can be further enhanced during the main discharge avalanching phase by sandblasting the discharge electrodes 105, 107 thereby presenting a uniformly rough surface consisting of a multiplicity of small points of electric field enhancement, from which electron avalanche can occur.

It is preferable if the electrode subassembly 101 can be formed as a unit and mounted into the laser vessel between the end flanges 70 and 92, without requiring excessively tight machining tolerances. This is achieved in a preferred embodiment which includes a compliant or flexible interconnect, such as the bellows conductor 218, between a feedthrough inner conductor 216 and the cathode electrode 105. This allows the main discharge feedthroughs 118–120 to be formed in a traditional ceramic to stainless steel metal-brazed construction. It also permits use of the materials of choice as discussed herein, namely stainless steel, metal-oxide ceramics, and metal-oxide brazing alloys.

Although many feedthroughs in parallel could be used in order to minimize the laser head loop inductance, the preferred approach in designing a cost effective laser is to minimize the number of expensive components such as feedthroughs, and to keep the inductance down to a level manageable by the external driving circuit PFN 34. This reduces the overall inductance per feedthrough.

In a preferred embodiment, the laser head uses the three main discharge feedthroughs 118, 119 and 120 which are of a predominately radial design in the region of laser vessel penetration. The inductance in this region scales as the natural log of the ratio between the radii of the inner conductor 216 and the flange assembly 220 which functions as an outer conductor. Disposed between these inner and outer conductors is the ceramic insulator 230 of the feedthrough which can be high temperature brazed to the inner conductor 216 and outer conductor 220, forming a traditional high vacuum seal, but one which is of fundamental importance in minimizing water permeation and halogen reaction in the presently discussed laser design.

In the region of the high voltage applied across these feed throughs 118–120, undesirable parasitic corona plasma generation is possible. To prevent the potential spread of corona plasma insulator gaps from shorting out the main discharge loop, care can be taken to lower the electric field strengths below the onset of corona over as large a gap as possible, without compromising inductance. In general, lower inductance is accompanied by an increase in the potential for incipient corona plasma generation. In the present design, the inner conductor 116 of the main discharge feedthrough 119 is reduced in diameter inside the laser vessel and before the current return shroud take-off. This provides a rapid transition from a low inductance, co-axial relationship to a high inductance, low corona probability interconnect.

Although the invention has been disclosed with reference to specific embodiments, methods and materials, many modifications of these specific concepts will now be apparent to those skilled in the art. Accordingly, one is cautioned not to limit these concepts to the disclosed embodiments, but rather to determine the scope of the invention only with reference to the following claims.

I claim:

1. A preionization assembly for a laser including a laser vessel and having a high voltage electrode and a ground electrode defining a discharge region extending longitudinally through the vessel, the assembly comprising:
- a plurality of pin assemblies arranged in at least one line extending longitudinally through the laser vessel along the discharge region, the pin assemblies being generally equally spaced along the line;
- an anode pin included in an associated one of the pin assemblies;
- a cathode pin included in the one pin assembly, and
- the anode pin being oriented relative to the cathode pin so that a spark passing between the anode pin and the cathode pin arcs in a direction which is longitudinal of the vessel along the discharge region.

2. The preionization assembly recited in claim 1 wherein:
- the pin assemblies are arranged to form a first line and a second line;
- the pin assemblies in the first line being disposed generally at a first distance from the discharge region;
- the pin assemblies from the second line being disposed at a second distance from the discharge region; and
- the first distance being generally equal to the second distance.

3. The preionization assembly recited in claim 1, wherein:
- the ground electrode has a particular surface disposed generally in a plane and oriented to face the high voltage electrode the anode pin extends transverse to the particular surface and terminates generally in the plane of the particular surface and the cathode pin extends generally in the plane of the particular surface and terminates in an end surface facing the anode pin.

4. The preionization assembly recited in claim 3 wherein the end surface of the cathode pin is beveled to define a sharp edge in closest proximity to the anode pin.

5. A laser, comprising:
- a laser vessel having a longitudinal configuration and defining a laser cavity;
- a high voltage electrode disposed in the laser cavity and having a length extending longitudinally of the laser vessel;
- a ground electrode disposed in the laser cavity and having a length extending longitudinally of the laser vessel, the ground electrode extending along the high voltage electrode and defining with the high voltage electrode a discharge region;
- a halogen gas disposed in the vessel;
- a preionization assembly disposed along the discharge region for ionizing the halogen gas to a generally uniform density in the discharge region;
- a plurality of pin assemblies included in the preionization assembly and arranged to form at least one line extending longitudinally in the laser cavity in general proximity to the discharge region, the pin assemblies being generally equally spaced along the line;
- an anode pin included in an associated one of the pin assemblies;
- a cathode pin included in the one pin assembly in spaced relationship to the associated anode pin;
- and the anode pin being oriented relative to the cathode pin so that a spark passing between the anode pin and the cathode pin arcs in a direction extending along the line.

6. The laser recited in claim 5 further comprising:
- a plurality of anode pins each included in an associated one of the pin assemblies;
- a distributive feed extending longitudinally within the vessel and providing an energizing voltage for the pin assemblies; and
- means for coupling the anode pins of each of the pin assemblies to the distributive feed.

7. The laser recited in claim 6 wherein the distributive feed in radial cross section has the configuration of an "I" beam providing the distributive feed with capacitive characteristics.

8. The laser recited in claim 7 further comprising a plurality of ballasting inductors included in the coupling means, each of the inductors being disposed to electrically couple an associated one of the anode pins to the distributive feed.

9. The laser recited in claim 8 wherein at least one of the ballasting inductors has the configuration of a spring.

* * * * *